Sept. 20, 1971    K. W. STOOKEY    3,606,282
HIGH TEMPERATURE HEAT EXCHANGER AND METHOD OF OPERATING
Filed May 6, 1970
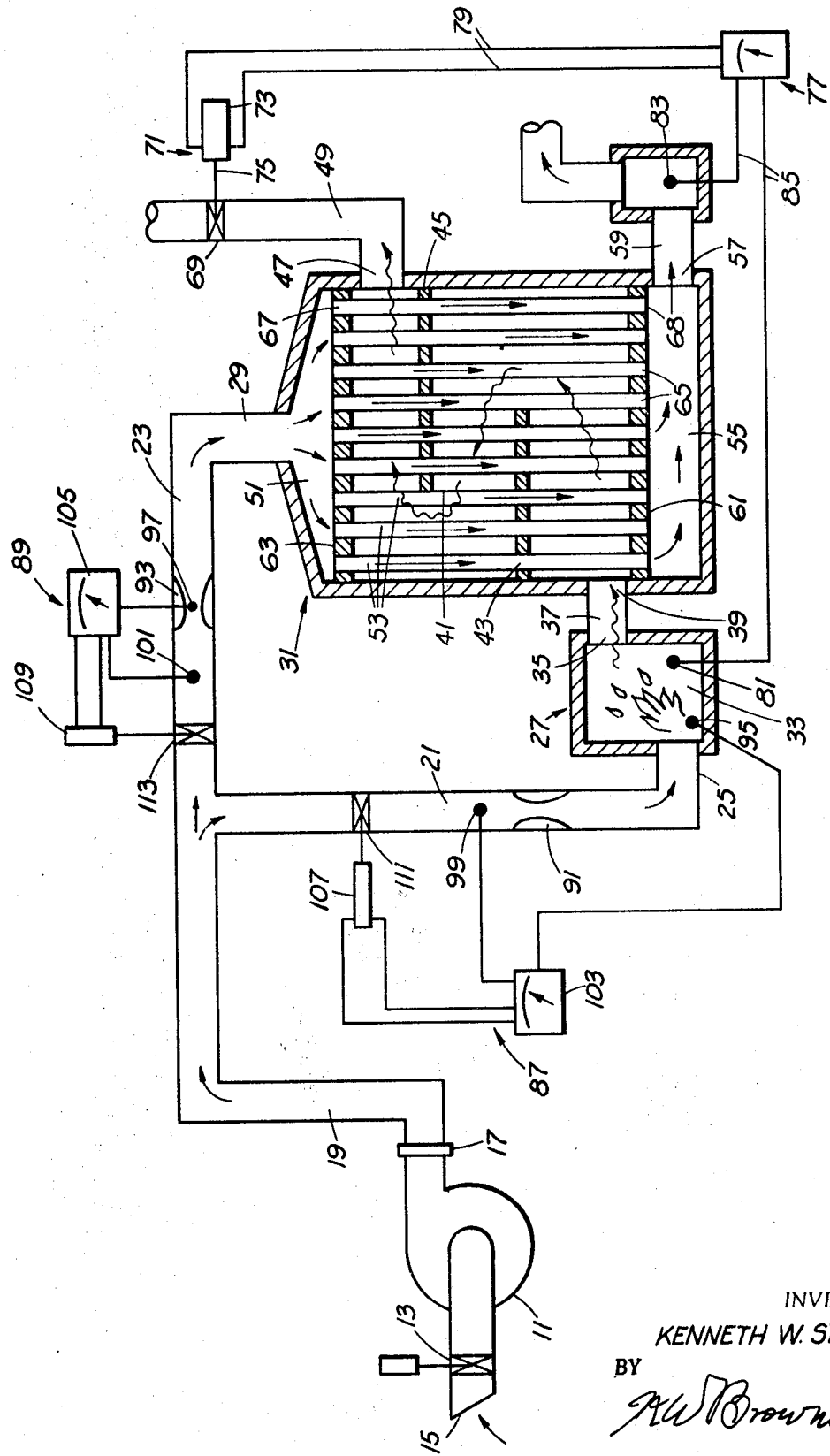
INVENTOR.
KENNETH W. STOOKEY
BY
R. W. Brownell United States Patent Office 3,606,282
Patented Sept. 20, 1971

3,606,282
HIGH TEMPERATURE HEAT EXCHANGER
AND METHOD OF OPERATING
Kenneth W. Stookey, Markle, Ind., assignor to Torrax
Systems, Inc., North Tonawanda, N.Y.
Filed May 6, 1970, Ser. No. 34,960
Int. Cl. F23l 15/04
U.S. Cl. 263—20                               15 Claims

ABSTRACT OF THE DISCLOSURE

A heat exchanger of the refractory tube type is provided with pressure control means whereby the entire heat exchanger system is operable at high pressures without detrimental effects by maintaining a low predetermined pressure differential across the walls of the heat exchanger tubes. Control means are provided to regulate the flow of the hot gases through the system and adjust the pressure thereof in response to changes in the pressure of the gases or fluid in opposite sides of the system.

BACKGROUND OF THE INVENTION

Hot process air is frequently used in metallurgical operations incineration and other applications where there is a demand for better furnace control, more rapid flame heating capacity of a furnace.

Prior art heat exchangers constructed substantially of all refractory components are capable of heating process air to high temperatures. However, due to the inherent permeability of thin walled refractories, and refractory joints separating hot gases from process air and the difficulty of providing a leakproof sealing therebetween, refractory heat exchangers are prone to leak causing contamination of process air with hot gases.

This leakage increases with any increase in the pressure differential between the process air and hot gases.

To meet the modern demands for process air at increasingly high pressures, on the order of 2 to 35 or more pounds per square inch, high pressure differentials can be expected.

Furthermore, the situation is complicated by the fact that many furnaces have rapidly fluctuating pressure requirements for process air. For instance, in a vertical shaft furnace having a descending burden and process air flowing upwardly therethrough, the burden presents a variable resistance to the air flow thereby causing a varying pressure therein. A sudden change in pressure is immediately reflected in the process air within the heat exchanger.

Relatively high pressure differentials result in the contamination of process air or its loss by leakage into the hot gaseous exhaust, and higher pressure differentials can cause severe damage, such as a lifting of ceramic head blocks or fracturing of ceramic tubes. In this latter case, the process must be interrupted by the shut down of the heat exchanger until the necessary repairs can be made thereby causing great inconvenience and economic loss.

Therefore, it has heretofore been considered essential to operate refractory tube type heat exchangers at low pressures on the order of less than one inch water column to avoid damage to the system as well as to minimize inefficiencies caused by excessive leakage through the tube walls of the exchanger, or through header block joints created, by high pressure differentials between the tube walls. This invention will solve these difficulties and open up many applications heretofore impossible to do.

SUMMARY OF THE INVENTION

It is an object of the present invention to provide a heat exchanger provided with pressure control means so that the heat exchanger can be operated at high pressures of process air delivery while maintaining a low pressure differential across the tube walls.

It is a further object of the present invention to provide a refractory heat exchanger that operates without leakage and contamination of process gases at pressures from 2 to 35 pounds per square inch or more.

Other and further objects of the present invention will become apparent from the following description.

In accordance with the present invention there is provided a refractory heat exchanger with pressure control means, said heat exchanger being adapted for heating process gases indirectly with hot gases, said pressure control means comprising a valve for regulating the flow of hot gases exiting from the heat exchanger so as to control the pressure of the hot gases within said heat exchanger and means for operating said valve means being responsive to pressure fluctuations between the process gases and hot gases so as to substantially maintain a predetermined pressure differential therebetween within the heat exchanger.

Also, in accordance with the present invention there is provided an externally fired hot blast system with a pressure control means, said system comprising a refractory heat exchanger adapted for heating process gases indirectly with hot gases, a combustion chamber for supplying hot gases to said heat exchanger, a blower means for supplying air to said combustion chamber and process gases to said heat exchanger, said pressure control means comprising a valve means for regulating the flow of hot gases exiting from said heat exchanger so as to control the pressure of the hot gases within said heat exchanger, and means for operating said valve means responsive to pressure fluctuations between the process gases and hot gases so as to substantially maintain a predetermined pressure differential therebetween within said heat exchanger.

Also, in accordance with the present invention there is provided a method for operating a high temperature heat exchanger and a high temperature air blast system both at relatively high pressures.

BRIEF DESCRIPTION OF THE DRAWING

The sole figure of the drawing schematically illustrates the pressure control system in conjunction with an externally fired hot blast system.

DESCRIPTION OF THE PREFERRED EMBODIMENT

Referring in more detail to the drawing, a single blower 11 consisting of an impeller enclosed by a volute-shaped casting is shown. A motor (not shown) drives the impeller. The blower 11 is selected so as to deliver a sufficient quantity of air at an adequate discharge pressure for maximum conditions. A valve 13 is located in the inlet 15 of the blower 11 for controlling the pressure delivered thereby.

The blower outlet 17 is connected to a conduit 19 which branches into conduit 21 and conduit 23. Conduit 21 is connected to the inlet 25 of the combustion chamber 27 and conduit 23 is connected to the process air inlet 29 of the heat exchanger 31.

The combustion chamber 27 includes gas burner 33 disposed therein for burning fuel, preferably oil or gas fuel, with the oxygen in the air supplied through inlet 25 to produce a hot exhaust or hot gases. The fuel is essentially completely burned with at least a stoichiometric amount of oxygen being supplied thereto. The hot gases exit the combustion chamber 27 through outlet 35 and flow through conduit 37 which is connected to heat exchanger inlet 39 for hot gases.

The hot gases entering the heat exchanger 31 through the inlet 39 follow the path of the wavy arrows. They flow through chamber 41 around baffles 43, 45 horizontally disposed therein and exit through outlet opening 47 for hot gases which is vented to the atmosphere by vent or outlet conduit 49. If desired the gases may be cleaned by conventional methods to remove obnoxious material.

The process air enters the heat exchanger 31 at inlet 29 where it flows into compartment 51 following the flow path indicated by the straight arrows. It then passes downwardly through bank of tubes 53 opening into compartment 55 thereby passing across chamber 41. From compartment 55 the heated process air exits through outlet 57 into conduit 59 which is connected to a furnace (not shown) utilizing the process air.

The bottom wall 61 and top wall 63 define the floor and ceiling, respectively, of chamber 41 and are each an assembly of refractory head blocks having a plurality of openings 65 therein. Between the top and bottom walls 61, 63 or upper and lower head blocks a plurality of refractory tubes 53 each connect an upper head block opening 67 to its respective matching lower head block opening 68 for the passage of process air therethrough. The ends of the tubes 53 bear against the head blocks of walls 61, 63 with a packing of heat resistant and resilient material (not shown) interdisposed therebetween to permit expansion and contraction of the tubes 53.

The pressure control means includes a valve 69 which regulates the pressure of hot gases within chamber 41 by opening to decrease the pressure and closing to increase the pressure. The valve 69 is located in outlet conduit 49.

A valve actuator 71 opens and closes the valve 69 in conformity with the supply of energy thereto. The valve actuator 71 includes a cylinder 73 housing a piston. The flow of hydraulic fluid causes a rod 75 connected to the piston to move back and forth. The rod 75 is in turn operatively connected to a valve stem of valve 69 for actuation thereof.

A controller 77 operatively associated with the valve actuator 71 is sensitive to the difference in pressures between the hot gases entering and process air exiting the heat exchanger 31. The controller 77 is set to supply energy to the valve actutor 71 so as to substantially maintain a predetermined pressure differential between the hot gases and process air within heat exchangr 31. If the controller 77 senses a pressure fluctuation in either the process air or hot gases which would upset the pressure differential in the heat exchanger to vary from the predetermined one, it causes valve 69 to immediately open or close to counter the pressure fluctuation by adjusting the pressure in chamber 41. This control is achieved by supplying hydraulic fluid under pressure to the valve actuator 71 through lines 79. Hydraulic fluid is delivered under pressure to the controller by a flow pump (not shown) from a suitable tank or reservoir (not shown).

The pressure control means or counter pressure control of the present invention operates by sensing pressure variations acoss the walls of tubes 53. Especially those variations of such degree as to cause contamination of process air, fracturing of tubes 53, or lifting of head blocks 61, 63. A detecting means is provided for detecting pressure fluctuations external to the heat exchanger or fluctuations between the hot gases entering the heat exchanger and the process air exiting the heat exchanger. The detecting means includes a pair of pressure probes 81, 83. One probe 81 is positioned in combustion chamber 27 and the other in conduit or outlet 59 connecting the furnace. The probes 81, 83 sense immediately fluctuations in the pressure therebetween and transmit the fluctuations to controller 77 through lines 85.

The predetermined pressure differential is selected so that the pressure of the process air exceeds slightly by a predetermined amount of pressure of the hot exhaust gases within the heat exchanger 31. The differential is not so great as to risk the fracturing or cracking of the refractory tubes or cause undue leakage of process air into the exhaust gases and subsequent loss thereof. For refractory heat exchangers employing thin walled refractory tubes the pressure differential should not exceed about one pound per square inch and is preferably less than one-half pound per square inch. The pressure differential is preferably maintained above one one-hundredth pound per square inch.

Conduit 21 has associated therewith a means 87 for regulating the quantity of air flowing therethrough so as to maintain the flow at a substantially constant rate. Pressure probe 95 senses the pressure in the combustion chamber 33 and pressure probe 99 senses the pressure of the air prior to its flowing through restriction or orifice 91 in conduit 21. Controller 103 detects the pressure difference between probe 99 and probe 95 and supplies energy to valve actuator 107 which in turn actuates valve 111 so as to maintain a substantially predetermined pressure drop or rate of air flow across restriction 91. The pressure fluctuations of the process air which are countered by a corresponding pressure change in the hot gases upset the burning conditions in the combustion chamber and change the amount of air supplied thereto. Means 87 for regulating the air flowing through conduit 21 operates to correct this condition to maintain proper burning conditions. It is preferable to have it set to deliver a quantity of air in excess of the stoichiometric amount needed for burning.

Regulator means 89 in conduit 23 is independently operated so as to deliver a predetermined quantity of air unit of time to the furnace so as to maintain proper atmospheres and reaction conditions therein. It has associated therewith restriction 93, controller 105, pressure probes 93 and 101, and valve 113 which operate in a conventional manner to regulate the rate of air flowing through conduit 23.

The pressure control of the present invention is particularly effective in sensing fluctuations in furnace pressures or process air pressure fluctuations and responding thereto with a corresponding pressure change in the hot exhaust gases so as to maintain a predetermined pressure differential. For example, if the furnace pressure were to suddenly drop due to a decreased resistance of a descending burden, this decrease, if not matched by a corresponding decrease in the pressure of hot gases, would result in contamination of process air or even lifting of head blocks. Utilization of the present invention prevents this. In response to the reduction of pressure of the process air within the heat exchanger 41, the controller 77 immediately causes valve 69 to be opened the correct amount to reduce the pressure in chamber 41 so as to maintain the predetermined pressure differential. In effect, the pressure control acts so that a drop in process air pressure is simultaneously countered by a corresponding drop in the pressure of the hot gases. In a similar manner, an increase in process air pressure is immediately countered by an increase of pressure in chamber 41.

The opening or closing of valve 69 upsets the burning of the fuel in the combustion chamber 27 by altering the quantity of air supplied thereto. To compensate for this condition regulating means 87 acts to increase or decrease the differential air pressure between pressure probes 99 and 95 so as to substantially maintain a predetermined pressure drop or blow across restriction 91.

Although more than one blower may be used, a single blower is preferred as shown in the embodiment described in the drawings so that any pressure or flow changes caused thereby are simultaneously reflected in the process air and the hot gases.

Blowers of various types, such as a positive displacement blower, may be used in conjunction with the pressure control of the present invention. If so used, the measuring means necessarily includes a vent with the valve positioned so that the proper amount of air will be vented off and only air of a predetermined quantity will be delivered to the furnace and combustion chamber.

Heat exchangers composed substantially of refractory components, particularly those described in U.S. Pats. 3,129,931; 3,220,711 and 3,387,836 can be used. These heat exchangers employ thin walled tubes and a plurality of head blocks having spacings and sealing means therebetween providing substantially free expansion of each block toward and away from its contiguous blocks.

Although the pressure control means including controller 77 and actuator 73, regulating means 87 and regulating means 89 are shown in the drawings as being hydraulically operated, they can be operated pneumatically or electrically.

In the embodiment shown in the drawing, pressure probe 81 is preferably positioned in combustion chamber 27 and pressure probe 83 is preferably positioned in outlet 59. These pressure probes can operably be located in other positions providing one probe is located in the hot gases and the other in the process air.

The heat exchanger employed in the present invention is preferably operated with the process air flowing through tubes 53 on the tube side and the hot exhaust gases flowing countercurrent thereto in chamber 41 around baffles 43 and 45 on the shell side. However, the two flows can be concurrent or the process air can be on the shell side and hot gases on the tube side. However, in either case the two flows are separated by a refractory barrier.

Although air is described as the fluid being heated, the present invention is not limited to heating air but it can heat process gases including nitrogen, helium, methane and various other gases. When a single blower is utilized with a hot blast system, the process gases necessarily contain oxygen if a combustion chamber is utilized. If separate sources for process gases and hot gases are employed, the process gases may contain no oxygen for combustion.

While preferred embodiments of this invention have been described and illustrated, it is to be recognized that modifications and variations thereof may be made without departing from the spirit and scope of this invention as described in the appended claims.

I claim:

1. A refractory heat exchanger with a pressure control means, said heat exchanger being adapted for heating process gases indirectly by hot gases, said pressure control comprising a valve means for regulating the flow of hot gases exiting from said heat exchanger so as to control the pressure of the hot gases within said heat exchanger and means for operating said valve means being responsive to pressure fluctuations between the process gases and hot gases so as to substantially maintain a predetermined pressure differential therebetween within the heat exchanger.

2. A heat exchanger in accordance with claim 1 wherein said operating means includes an actuating means for opening and closing said valve means in conformity with the supply of energy thereto and a controller means for regulating the supply of energy to said actuating means.

3. A heat exchanger with a pressure control means in accordance with claim 2 wherein said heat exchanger includes a first inlet and a first outlet for process gases and a second inlet and second outlet for hot gases, said valve being positioned in said second outlet.

4. A heat exchanger with a pressure control means in accordance with claim 3 wherein said operating means includes a first probe positioned in said first outlet and a second probe positioned in said second inlet for measuring the pressure differential therebetween.

5. A heat exchanger with a pressure control means in accordance with claim 4, wherein said heat exchanger comprises refractory tube walls separating the process gases from the hot gases, said controller being sensitive to the pressure differential between said first probe and said second probe, said controller supplying hydraulic fluid under pressure to said actuating means so as to open or close said valve means when the pressure differential is respectively greater or less than the predetermined pressure differential.

6. An externally fired hot blast system with pressure control means, said system comprising a heat exchanger being adapted for heating process gases indirectly with hot gases, a combustion chamber for supplying hot gases to said heat exchanger, a blower means for supplying air to said combustion chamber and process gases to said heat exchanger, said pressure control means comprising a valve means for regulating the flow of hot gases exiting from said heat exchanger so as to control the pressure of hot gases within said heat exchanger and means for operating said valve means being responsive to pressure fluctuations between the process gases and hot gases so as to substantially maintain a predetermined pressure differential therebetween within said heat exchanger.

7. A hot blast system in accordance with claim 6 wherein said pressure control means includes a means for regulating the flow of air to said combustion chamber so as to deliver a substantially constant quantity thereto.

8. A hot blast system with a pressure control means in accordance with claim 7, wherein said blower has an inlet and an outlet, said system includes a first conduit connected to the outlet of said blower, a second conduit and a third conduit branching from said first conduit, said combustion chamber has an inlet connected to said second conduit and an outlet for hot gases, said heat exchanger has a first inlet and a first outlet for process gases and a second inlet and a second outlet for hot gases, the process gases being heated by hot gases and being separated therefrom by a refractory tubes, said first inlet being connected to said third conduit for the passage of process gases, a fourth conduit connects the outlet for hot gases of the combustion chamber to the second inlet, said valve means being positioned in the second outlet, and said regulating means being operatively associated with said second conduit.

9. A hot blast system in accordance with claim 8 wherein said operating means includes an actuating means for opening and closing said valve means in conformity with the supply of energy thereto and a controller means for regulating the supply of energy to said actuating means.

10. A hot blast system in accordance with claim 9 wherein said operating means includes a first probe positioned in said first outlet and a second probe positioned in said combustion chamber for measuring the pressure differential therebetween.

11. A hot blast system in accordance with claim 10 including a second means for regulating the flow of gases being positioned in said third conduit for delivering a substantially constant quantity of process gases.

12. A hot blast system in accordance with claim 11 wherein said controller supplies hydraulic fluid under pressure to said actuating means so as to open or close said valve means when the pressure differential is respectively greater or less than the predetermined pressure differential.

13. A method for operating a high temperature refractory heat exchanger at relatively high pressures comprising supplying hot gases and process air under pressure to said heat exchanger, heating process air indirectly with hot gases within said heat exchanger, and regulating the flow of hot gases exiting from said heat exchanger so as to control the pressure of the hot gases within said heat exchanger in response to pressure fluctuations between the process air and hot gases so as to substantially maintain a predetermined pressure differential between the hot gases and process air within said heat exchanger.

14. A method for operating a heat exchanger in accordance with claim 13 comprising passing the hot exhaust gases countercurrently to the process air within the heat exchanger.

15. A method for operating a heat exchanger in accordance with claim 14 comprising supplying a relatively constant quantity of air under pressure to a combustion chamber, burning fuel with the air in said combustion chamber to form the hot gases.

References Cited

UNITED STATES PATENTS 3,117,539  1/1964  Heyn _____ 263—20

JOHN J. CAMBY, Primary Examiner

U.S. Cl. X.R.

165—32